United States Patent [19]
Kim

[11] Patent Number: 6,069,864
[45] Date of Patent: May 30, 2000

[54] METHOD OF RECORDING DATA COMPENSATED USING PRE-RECORDED SIGNALS FROM AN OPTICAL MEDIUM

[75] Inventor: Dae Young Kim, Seoul, Rep. of Korea

[73] Assignee: LG Electronics, Inc., Seoul, Rep. of Korea

[21] Appl. No.: 09/258,421

[22] Filed: Feb. 26, 1999

[30] Foreign Application Priority Data

Feb. 27, 1998 [KR] Rep. of Korea .................. 98-7001

[51] Int. Cl.[7] .................................................. G11B 7/00
[52] U.S. Cl. .............................. 369/116; 369/48; 369/54; 369/124
[58] Field of Search .................... 369/44.13, 44.29, 369/116, 47, 44.26, 48, 59, 275.3, 44.35, 44.34, 54, 124

[56] References Cited

U.S. PATENT DOCUMENTS

| | | | |
|---|---|---|---|
| 5,377,178 | 12/1994 | Saito et al. | 369/124 |
| 5,537,373 | 7/1996 | Horikiri | 369/44.13 |
| 5,574,707 | 11/1996 | Hirai | 369/48 |
| 5,629,912 | 5/1997 | Okawa et al. | 369/44.29 |
| 5,675,568 | 10/1997 | Hajjar et al. | 369/116 |

*Primary Examiner*—Tan Dinh
*Assistant Examiner*—Kim-Kwok Chu

[57] ABSTRACT

A method of recording a data on an optical recording medium recorded previously with a support signal such as a wobbling signal, thereby allowing the data to be reproduced from the optical recording medium without a distortion by a low frequency signal at a reproducing mode. In the recording method, a periodic signal pre-recorded on the optical recording medium is detected. Then, a signal in accordance with the data is recorded on the optical recording medium depending on a level of the periodic signal.

19 Claims, 8 Drawing Sheets

METHOD OF RECORDING DATA COMPENSATED USING PRE-RECORDED SIGNALS FROM AN OPTICAL MEDIUM

BACKGROUND OF THE INVENTION

1. Field of the Invention

This invention relates to a writable recording medium, and particularly to a method and apparatus for performing a recording of data for an optical recording medium recorded with a support signal such as a wobbling signal which is used to record the data.

2. Description of the Related Art

Nowadays, an optical recording medium prevails in recording media for recording an information such as video and audio information. A write-once disc, such as CD-ROM, DVD-ROM, etc., and a write-once read-many type of disc, such as CD-R, DVD-R are available for the optical recording medium in the market. Recently, there has been suggested a rewritable disc such as CD-RW(compact disc-rewritable), DVD-RW(digital versatile disc-rewritable), etc.

As shown in FIG. 1, the DVD-RAM is divided into a data area DA for recording a user data and a header area HA pre-formatted with an identification information. The data area DA and the header area HA exist alternately in the circumferential direction of the DVD-RAM. As shown in FIG. 1B, the data area DA is provided with a groove track 10 having a concave section and a land track 12 having a convex section. These groove and land tracks 10 and 12 exist alternately in the radial direction. Recording pits are defined along a center-line of the disc at each of the groove and land tracks 10 and 12 to record a user data. The recording pits 14 are produced by which the recording material changes over from a crystalline state into an amorphous state. An optical reflective rate of the recording pit is lower because the recording pit has the amorphous state. Also, a boundary side 18 of the groove and land tracks 10 and 12 is wobbled in a shape of sinusoidal-wave signal. A wobbling signal occupying a low frequency band is detected by changing a light quantity reflected by the wobbled boundary side 18 periodically. This wobbling signal is used to generate a channel clock for detecting data from a data signal occupying a high frequency.

To record user data on the disc, a data recording apparatus as shown FIG. 2 is used. The data recording apparatus includes a bit counter 20, a recording pulse generator 22, a light driver 24 and a laser diode 26 connected serially to an input line 21. The input line 21 receives a channel bit stream CBS as shown FIG. 3. The channel bit stream CBS is obtained by encoding the user data in such a manner that a total length of the recording pits in a constant length of unit recording region corresponds to 50% the length of the unit recording region. Therefore, in the channel bit stream, there are included a plurality of data having "0" or "1" which is continued by 3 to 11 times. In other words, the channel bit stream consists of a plurality of data each having length of "3T" to "11T". The bit counter 20 checks whether the data included in the channel bit stream CBS has the length of 3T to 11T, and generates a pulse having a specific logic in a period which "1" is continued. By the bit counter 20, the channel bit stream CBS is converted into a channel bit clock CBC having a shape of signal required by the disc, as shown FIG. 3. Intervals of high and low logic in the channel bit clock CBC have the length of the 3T to 11T. The recording pulse generator 22 converts the channel bit clock CBC into a shape of signal adapted to generate recording lights. To this end, a recording pulse train WPT as shown FIG. 3 is produced in the recording pulse generator 22. The light driver 24 supplies the laser diode 26 with a driving current in accordance with the recording pulse train WPT from the recording pulse generator 22. The laser diode 26 irradiates a laser beam on the disc by the driving current from the light driver 24. The laser beam forces the crystalline state of the disc to change into the amorphous state such that the recording pits are defined on the disc. As a result, the user data included in the channel bit stream CBS is recorded on the disc.

The recording pits defined on the disc are detected in a form of a radio frequency signal while at reproducing. This results from the fact that a light quantity reflected by the recording pit of the amorphous state is less than that reflected by the crystalline region. Also, the recording pits are recovered into a shape of a pulse train by means of a reconstructed signal detector included in an optical disc reproducing apparatus. The recorded signal detector consists of an equalizer 30 and a comparator 32 connected in series, and an integrator 34 connected to a feedback loop of the comparator 32, as shown FIG. 4. The equalizer 30 receives a radio frequency signal RF detected by an optical pickup (not shown). As shown in FIG. 5, the radio frequency signal RF has a different amplitude depending on a length (e.g., 3T to 11T) of the recording pit 14 or pre-pit 16. Such a radio frequency signal RF is equalized by means of the equalizer 30 in such a manner to has a constant amplitude like an equalized radio frequency signal ERF in FIG. 5. The equalizer 30 controls an amplification factor in accordance with the amplitude of the radio frequency signal RF, thereby applying the equalized radio frequency signal having a constant amplitude to the comparator 32. The comparator 32 converts the equalized radio frequency signal ERF into a pulse signal PS shown in FIG. 5. To this end, the comparator 32 compares the equalized radio frequency signal ERF with a slice voltage Vsl and forms a logical signal from the compared result. The pulse signal generated at the comparator 32 has a width corresponding to a length (e.g., 3T to 11T) of the recording pit 14 or the pre-pit 16. The integrator 34 integrates the pulse signal PS from the comparator 32 to detect an average level voltage of the pulse signal PS, that is, a direct current voltage level. Also, the integrator 34 applies the average level voltage to the comparator 32 as the slice level voltage Vsl. The slice level voltage Vsl varies in accordance with a length of the recording pit 14 and a distance ratio between the recording pits 14. Accordingly, the pulse signal outputted from the comparator 32 always has a duty ratio of 50%, and allows a user data to be reproduced accurately.

As described above, a user data recorded on the disc is encoded in such a manner that a total length of the recording pits 14 included in a constant length of unit recording region (i.e., frame) corresponds to 50% the length of the unit recording region. Accordingly, when a normally recorded user data is reproduced, an average voltage level of the pulse signal PS detected by the integrator 34 has "0 V". As a result, the normal pulse signal PS identical to that upon reproduction is detected from the comparator 32 without a variation in the slice level voltage Vsl. Otherwise, the recording pits occupy a region more than or less than 50%, of the unit recording region at the time of recording a data due to a recording light quantity, a rotation speed or a surrounding temperature, etc. A high logic pulse width of the pulse signal PS when a user data recorded in the unit recording region is reproduced, becomes narrower and wider than a high logic pulse width of the pulse signal PS when a normally recorded data is reproduced. This result from a light quantity reflected by the unit recording region abnormally being larger or smaller than a light quantity reflected by the unit recording region normally. When a unit recording region having the abnormally recorded data is reproduced, an average level voltage detected by the integrator 34 becomes higher or lower than "0 V". As the average level voltage becomes high or low, a high logic pulse width of the pulse signal PS outputted from the comparator 32 becomes narrow or wide. As a result, a pulse signal PS having always a constant range of width (i.e., 3T to 11T) is reconstructed at the comparator 32. As described above, the slice level voltage is controlled in accordance with a duty ratio of the pulse signal PS, thereby stably performing the reconstruction of the pulse signal PS using the comparator 32.

As shown in FIG. 6, a high frequency component of pit train signal PTS from the recording pit train 14 and/or the pre-pit train 16, as well as a low frequency component of wobbling signal WS from the boundary side between the wobbled groove and land tracks 10 and 12, is included in a high frequency signal WRF picked up from the disc such as the above-mentioned DVD-RAM, that is, a high frequency signal picked up from the wobbled track(hereinafter referred to as "wobbling radio frequency signal") . Due to this, a direct current voltage level of the wobbling radio frequency signal PRF fails to have a constant voltage level (e.g., "0 V") and changes in the low frequency component of wobbling signal as shown in FIG. 5. This is caused by a fact that a high frequency component of pit train signal PTS is combined with a low frequency component of wobbling signal WS to swing in accordance with an envelope of the wobbling signal WS. On the other hand, because a high frequency signal NRF, hereinafter referred to as "normal radio frequency signal", picked up from a disc without the wobbled groove and land tracks, hereinafter referred to as "normal disc", does not include the low frequency component of wobbling signal WS, it has a constant direct current voltage level (e.g., "0 V"). When both the wobbling radio frequency signal WRF and the normal radio frequency signal NRF is converted into a shape of pulse signal by means of the recorded signal detector in FIG. 3, a pulse signal WPS, hereinafter referred to as "wobbling pulse signal", derived from the wobbling radio frequency signal WRF has a length different from the length (i.e., 3T to 11T) of the recording pit 14 periodically, whereas a pulse signal NPS, hereinafter referred to as "normal pulse signal", derived from the normal radio frequency signal NRF has a width corresponding to the length of the recording pit 14. In other words, a large or small width of error is periodically generated in the wobbling pulse signal WPS. This is caused by a fact that the large-width error and the small-width error in the wobbling pulse signal WPS is canceled every a period of the wobbling signal WS to maintain a direct current voltage level detected at the integrator 32 constantly. Such a pulse reconstruction error will be more apparent from the following description with reference to FIG. 7.

Referring to FIG. 7, the wobbling radio frequency signal WRF is sliced on a basis of a slice level voltage Vsl to produce a wobbling pulse signal WPS. If the normal radio frequency signal NRF is sliced on a basis of a slice level voltage Vsl, then a normal pulse signal NPS is produced. Edges of the wobbling pulse signal WPS becomes gradually distant from edges of the normal pulse signal NPS and thereafter draws gradually near to them in accordance with a change in the amplitude of the wobbling signal. More specifically, the edges of the wobbling pulse signal WPS is most far away from the edges of the normal pulse signal NPS at the peak of the wobbling signal WS. For example, at the positive peak of the wobbling signal WS, the wobbling pulse signal WPS rises at a time "t1" going by a time interval Δ2 from a time "t1" when the normal pulse signal NPS rises. Further, a deviation Δ2 between the edge of the wobbling pulse signal WPS at the peak of the wobbling signal WS and the edge of the normal pulse signal NPS becomes larger than deviations Δ1 and Δ3 between the edge of the wobbling pulse signal WPS at the rising portion and the falling portion of the wobbling signal WS and the edge of the normal pulse signal NPS. Moreover, a width of the wobbling pulse signal WPS becomes narrower than that of the normal pulse signal NPS at the positive region of the wobbling signal WS, whereas a width of the wobbling pulse signal WPS becomes wider than that of the normal pulse signal NPS at the negative region of the wobbling signal WS.

As described above, the conventional recording signal detector detects a pulse signal having a width different from the length of the recording pits on the wobbled track. Such a width error in the pulse signal acts as a noise component at the later signal processing stage such as the conversion of channel bit stream, thereby preventing a user data on the wobbled track from being reproduced accurately.

SUMMARY OF THE INVENTION

Accordingly, it is an object of the present invention to provide a method and apparatus for recording data on an optical recording medium recorded with a support signal such as a wobbling signal, thereby allowing the data to be reproduced from the optical recording medium without a distortion by a low frequency signal at a reproducing mode.

In order to achieve these and other objects of the invention, a data recording method for an optical recording medium according to one aspect of the present invention includes the steps of: detecting a periodic signal pre-recorded on the optical recording medium; and recording the signal on the optical recording medium depending on a level of the periodic signal.

A data recording method for an optical recording medium according to another aspect of the present invention includes the steps of: detecting a support signal pre-recorded on the optical recording medium; and recording the signal on the optical recording medium depending on the support signal, the signal having a frequency different from the support signal.

A data recording method for an optical recording medium according to another aspect of the present invention includes the steps of: detecting a specific period of signal pre-recorded on the optical recording medium; generating a timing signal for the signal to be recorded on the optical recording medium; and modulating the timing signal according to a level of the specific period of signal.

A recorded signal reproducing apparatus for an optical recording medium according to still another aspect of the present invention includes: means for detecting a specific signal pre-recorded on the optical recording medium; and signal modulating means for modulating the signal corresponding to an input data depending on the specific signal.

A recorded signal reproducing apparatus for an optical recording medium according to still another aspect of the present invention includes: signal generating means for generating the recording signal corresponding to an input data; detecting means for detecting a specific period of signal recorded previously on the optical recording medium; width controlling means for adjusting a width of the recording signal on the basis of the specific period of signal; and driving means for converting the recording signal having a varied width into a light driving signal.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 8:
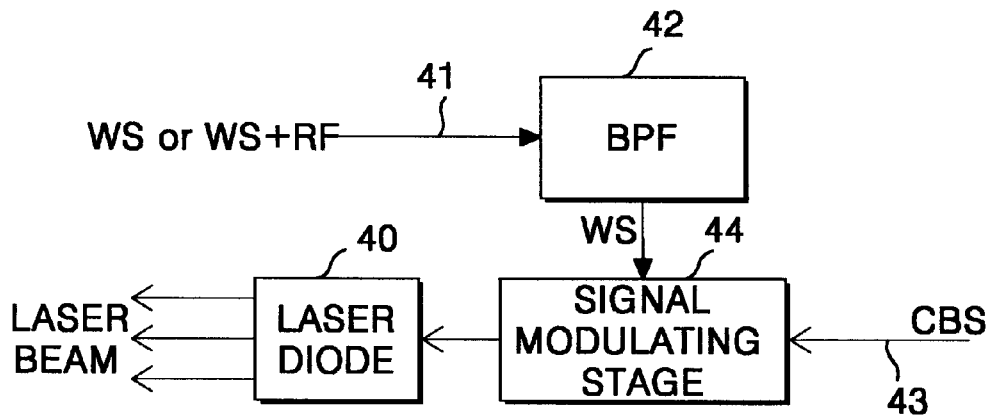
FIG. 8 is a schematic block diagram showing the configuration of a data recording apparatus according to an embodiment of the present invention.

Referring to FIG. 8, there is shown a data recording apparatus according to an embodiment of the present invention. In FIG. 8, the data recording apparatus includes a band pass filter (BPF) 42 and a signal modulating stage 44 connected between a first input line 41 and a laser diode 40 in series. The input line 41 receives a signal (hereinafter, a picked-up signal) picked up by an optical pick-up (not shown) from an optical recording medium. The picked-up signal includes a wobbling signal WS or a composite signal WS+RF having the wobbling signal WS and a radio frequency signal RF. The BPF 42 filters the picked-up signal from the first input line 41 to detect the wobbling signal WS. The wobbling signal WS detected by the BPF 42 is applied to the signal modulating stage 44. The signal modulating stage 44 receives a channel bit stream CBS from a second input line 43. The channel bit stream CBS includes a user data to be recorded on optical recording medium. The signal modulating stage 44 modulates the channel bit stream CBS depending on an amplitude level of the wobbling signal WS to generate a light driving signal. By the light driving signal generated in the signal modulating stage 44, the laser diode 40 irradiates a laser beam on the optical recording medium to define a recording pit train corresponding to the channel bit stream CBS on the optical recording medium. The laser beam irradiated on the optical recording medium is switched responding to the channel bit stream CBS. Also, an intensity (or light power) or an irradiating period of the laser beam varies in accordance with the level of the wobbling signal WS. Since the user data is recorded on the optical recording medium in the state of modulating with the wobbling signal WS, the radio frequency signal RF including the user data is only detected from the optical recording medium. This is caused by a fact that a wobbling signal WS pre-formatted on tracks of the optical recording medium is offset by a wobbling component included in the recorded user data (i.e., the recording pit train) on the optical recording medium at a reproducing of the optical recording medium.

Figure 9:
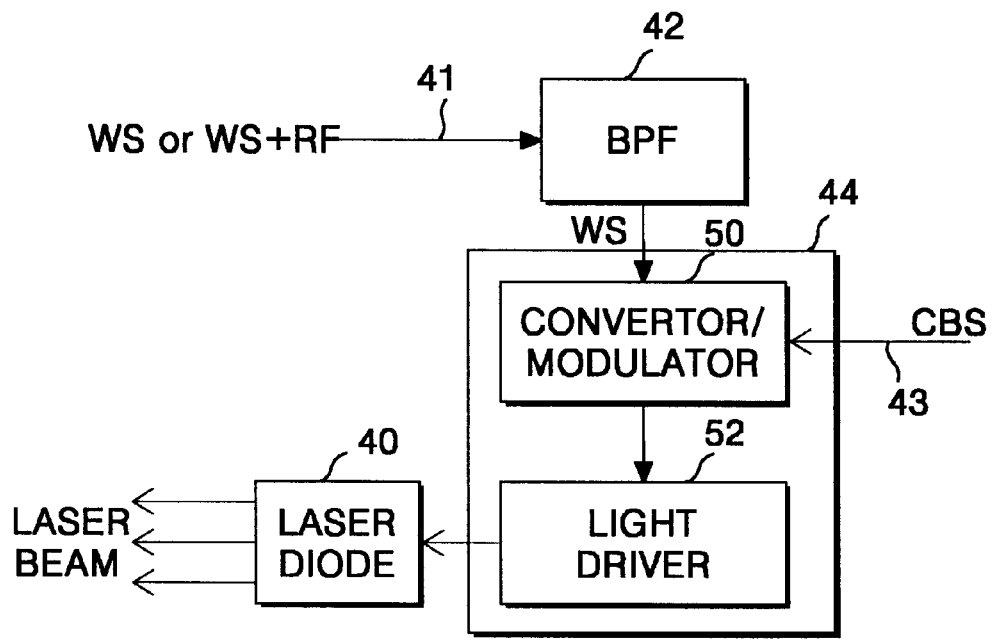
FIG. 9 is a detailed block diagram of the data recording apparatus illustrating an embodiment of the signal modulating stage shown in FIG. 8.

FIG. 9 shows an embodiment of the signal modulating stage 44 in FIG. 8. In FIG. 8, the signal modulating stage 44 consists of a converter/modulator 50 and a light driver 52 connected between the BPF 42 and the laser diode 40 in series. The converter/modulator 50 receives the channel bit stream CBS from the second input line 43. Also, the converter/modulator 50 converts the channel bit stream CBS from the second input line 43 into a recording pulse train and modulates the recording pulse train depending on a level of the wobbling signal WS from the BPF 42, thereby generating a recording signal. Then, the recording pulse train is amplitude-modulated or pulse width modulated by the wobbling signal WS. The recording signal is applied to the light driver 52. The light driver 52 responds to the recording signal from the converter/modulator 50 to generate a light driving signal. The light driving signal has a current quantity relative to an amplitude or a pulse width of the recording signal. The laser diode 40 irradiates a laser beam in accordance with the light driving signal on the optical recording medium, thereby recording the user data on a wobbled track of the optical recording medium. The laser beam irradiated on the optical recording medium is switched responding to the channel bit stream CBS. Also, an intensity (i.e., light power) or an irradiated period of the laser beam varies in accordance with the level of the wobbling signal WS. Since the user data is recorded on the optical recording medium in state of modulating with the wobbling signal WS, only the radio frequency signal RF including the user data is detected from the optical recording medium.

Figure 10:
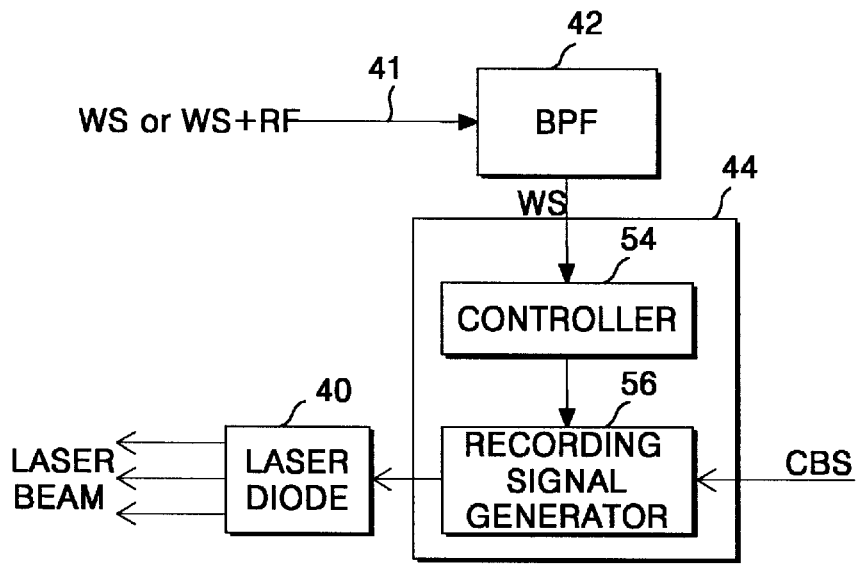
FIG. 10 is a detailed block diagram of the data recording apparatus illustrating another embodiment of the signal modulating stage shown in FIG. 8.

FIG. 10 illustrates another embodiment of the signal modulating stage 44 shown FIG. 8, in detail. In FIG. 10, the signal modulating stage 44 includes a controller 54 and a recording signal generator 56 connected serially between the BPF 42 and the laser diode 40. The recording signal generator 56 receives the channel bit stream CBS from the second input line 43. Also, the recording signal generator 56 produces a light driving signal in which a current is switched responding to the channel bit stream CBS from the second input line 43. The controller 54 generates a current control signal responding to the wobbling signal from the BPF 42. The current control signal controls a current quantity or a current applying interval of the light driving signal produced in the recording signal generator 56. In other words, the recording signal generator 56 amplitude-modulates the light driving signal on the basis of a level of the wobbling signal WS. On the other hand, the recording signal generator 56 pulse width modulates the light driving signal on the basis of the level of the wobbling signal WS. The laser diode 40 irradiates a laser beam in accordance with the light driving signal on the optical recording medium to record the user data on a wobbled track of the optical recording medium. The laser beam irradiated on the optical recording medium is switched responding to the channel bit stream CBS. Also, the intensity (i.e., light power) or an irradiating period of the laser beam varies in accordance with a level of the wobbling signal WS. Since the user data is recorded on the optical recording medium in state of modulating with the wobbling signal WS, only the radio frequency signal RF including the user data is detected from the optical recording medium at a reproducing mode.

Figure 11:
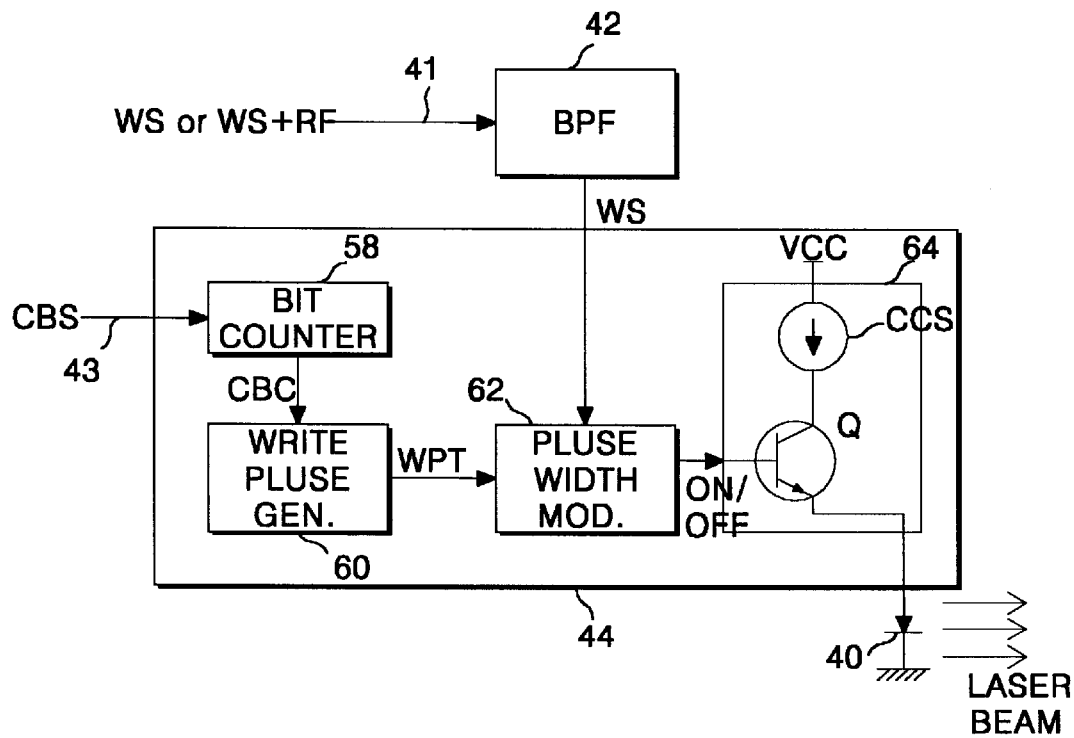
FIG. 11 is a detailed block diagram of the data recording apparatus illustrating an embodiment of the signal modulating stage shown in FIG. 8.
Figure 12:
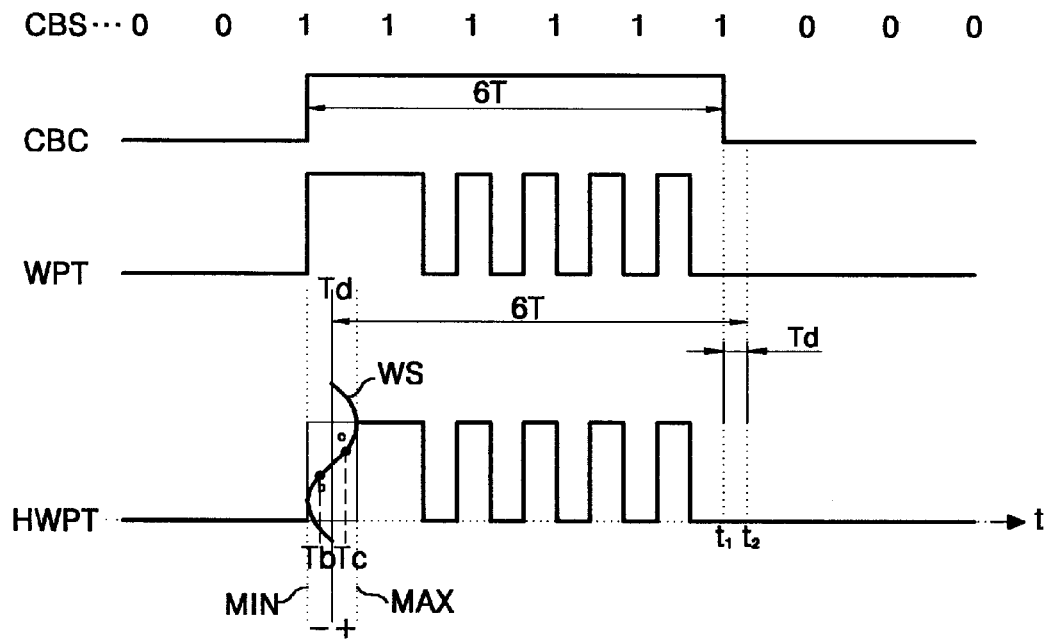
FIG. 12 is a waveform diagram for explaining an operation of the data recording apparatus of FIG. 11.

Referring to FIG. 11, there is illustrated another embodiment of the signal modulating stage 44 shown in FIG. 8, in detail. In FIG. 11, the signal modulating stage 44 includes a bit counter 58, a recording pulse generator 60, pulse width controller 62 and a light driver 64 connected between the second input line 43 and the laser diode 40 in series. The bit counter 58 checks whether the data included in the channel bit stream CBS has the length of the 3T to 11T, and generates a pulse having a specific logic (i.e., a high logic) in a period which "1" is continued. Consequently, the bit counter 58 converts the channel bit stream CBS into a channel bit clock CBC having a shape of signal required by the optical recording medium, as shown FIG. 12. Intervals of high and low logic in the channel bit clock CBC have the length of 3T to 11T. The recording pulse generator 60 converts the channel bit clock CBC into a shape of signal adapted to generate recording lights. To this end, a recording pulse train WPT such as shown FIG. 12 is produced in the recording pulse generator 60. The pulse width controller 62 receives the wobbling signal WS from the BPF 42 as well as the recording pulse train WPT from the recording pulse generator 60. Also, the pulse width controller 62 adjusts the width of the recording pulse train WPT (in detail, a starting pulse included in the recording pulse train WPT) on the basis of a level of the wobbling signal WS from the BPF 42. Consequently, a modulated recording pulse train MWPT is generated in the pulse width controller 62. Responding to the modulated recording pulse train MWPT, the light driving 64 switches a current signal to be applied to the laser diode 40 such that the laser diode 40 irradiates a laser beam on the optical recording medium. To this end, the light driver 64 includes a transistor Q for switching a constant current signal to be continuously applied from a constant current source to the laser diode 40 according to the recording pulse train from the pulse width controller 62. The transistor Q is turned-on to transmit the constant current signal from the constant current source CCS to the laser diode 40, when the modulated recording pulse go to a high logic. Whereas, if the modulated recording pulse is in a low logic, the transistor Q is turned-off to break the constant current signal applying to the laser diode 40. In other words, the transistor Q switches the constant current signal to be applied to the laser diode 40 such that the laser diode 40 irradiates the laser beam on the optical recording medium. Then, the laser beam irradiated on the optical recording medium is switched responding to the channel bit stream CBS. Also, an irradiating period of the laser beam is varied with the level of the wobbling signal WS. Therefore, the user data is recorded on the optical recording medium in state of pulse width modulating depending on the wobbling signal WS. As a result, only the radio frequency signal RF including the user data is detected from the optical recording medium at a reproducing mode. This results from the fact that a wobbling signal WS pre-formatted on tracks of the optical recording medium has been offset by a wobbling component included in the recorded user data (i.e., the recording pit train) on the optical recording medium during a reproducing mode.

Figure 1A:
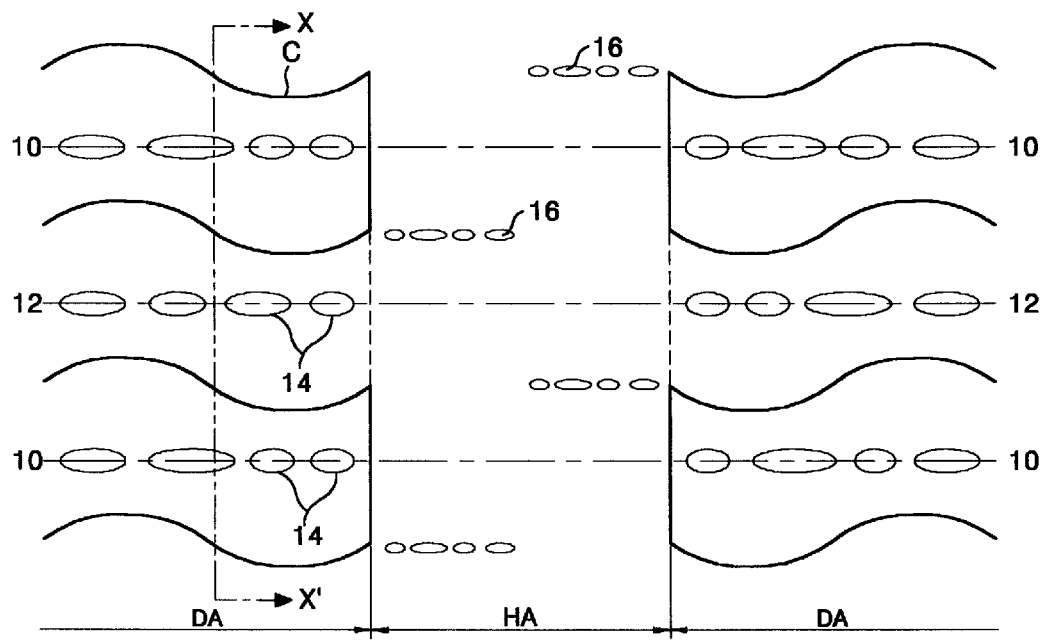
FIG. 1A is a schematic view showing a part of a DVD-RAM.
Figure 1B:
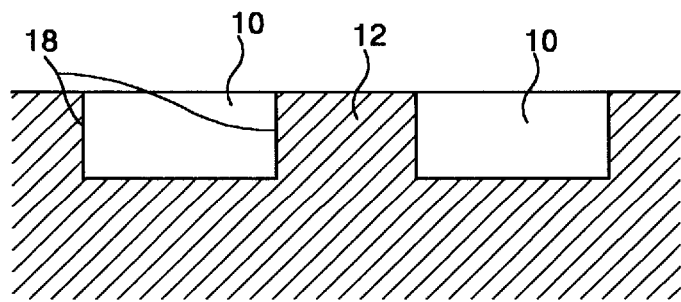
FIG. 1B is a sectional view of the tracks taken along the line X–X' in FIG. 1.
Figure 2:
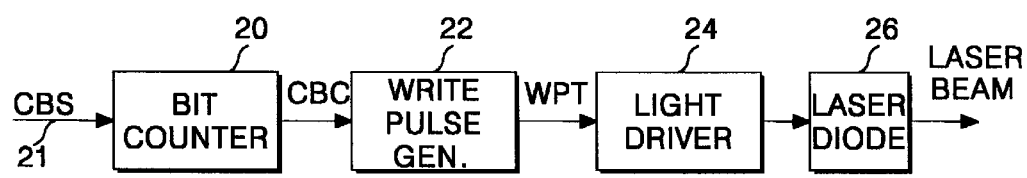
FIG. 2 is a schematic block diagram showing the configuration of a data recording apparatus according to the related art.
Figure 3:
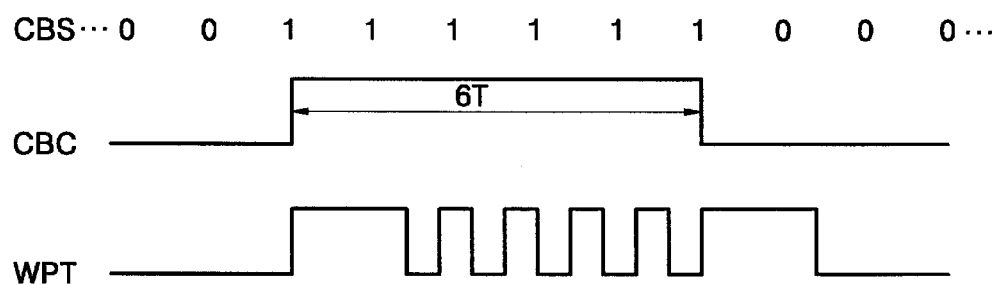
FIG. 3 is waveform diagrams of signals outputted from each part of the reconstructing apparatus in FIG. 2.
Figure 4:
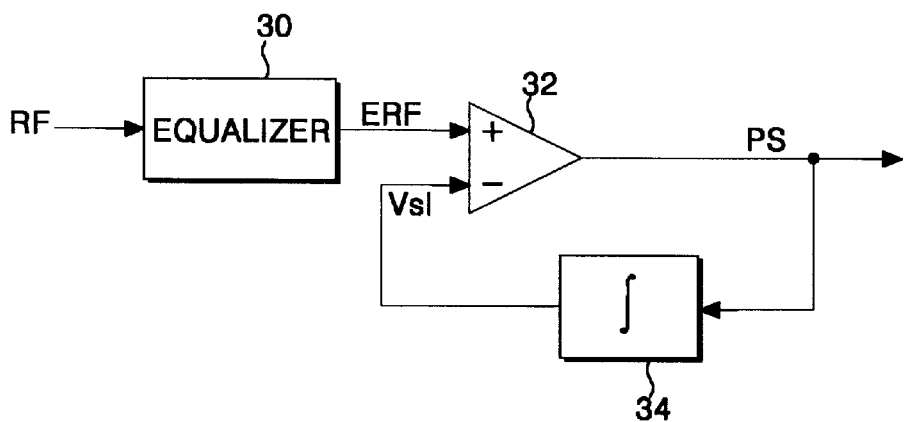
FIG. 4 is a schematic block diagram showing the configuration of the recorded signal detector according to the related art.
Figure 5:
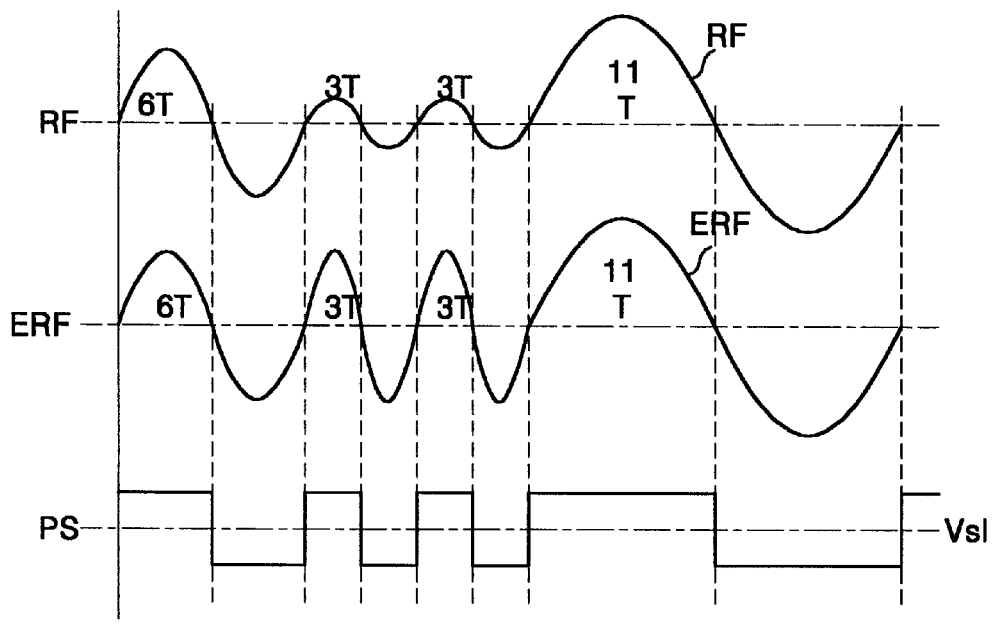
FIG. 5 is waveform diagrams of signals outputted from each part of the reconstructing apparatus in FIG. 4.
Figure 6:
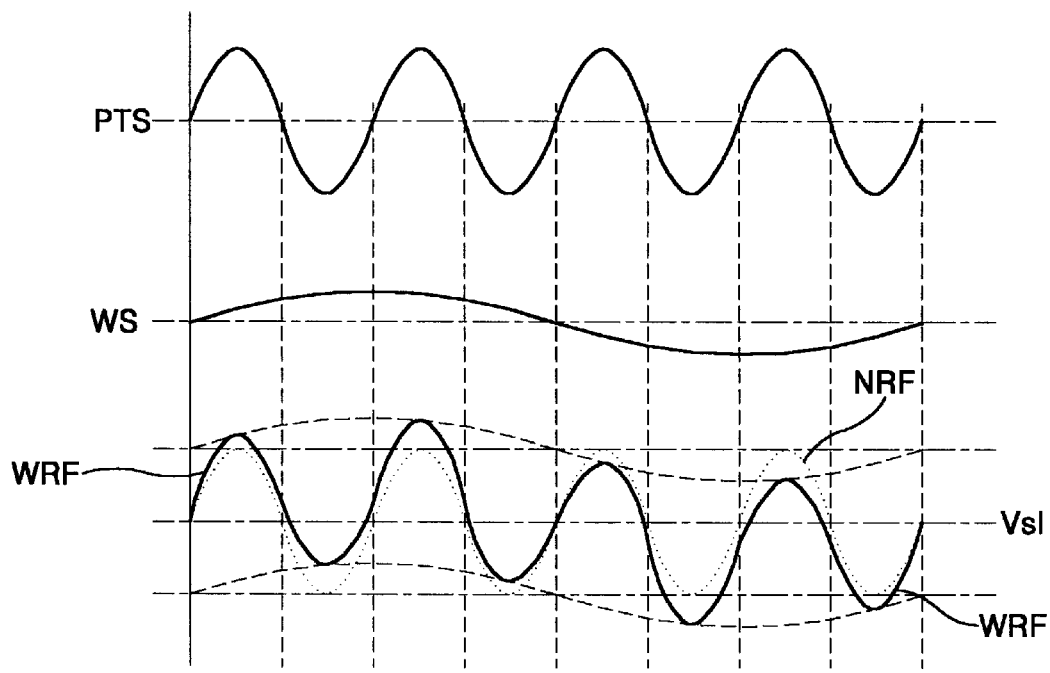
FIG. 6 is waveform diagrams of signals picked up from the DVD-RAM in FIG. 1A.

In order to prevent a distortion of the user data by wobbling signal WS in the reproducing mode, the modulated recording pulse train MWPT must have a width equal to the recording pulse train WPT when the user data is recorded at a position which the level of the wobbling signal is "0". Also, the modulated recording pulse train MWPT can not precede the recording pulse train WPT although the wobbling signal WS has a value of a negative polarity. Therefore, the modulated recording pulse train MWPT for the user data to be recorded at the position having the wobbling signal of "0" must be delayed from the recording pulse train WPT by a constant period Td. Also, an end point of the modulated recording pulse train is always delayed from an end point of the recording pulse train WPT by the constant period Td regardless of the level of the wobbling signal WS. Whereas, a start point of the modulated recording pulse train MWPT is moved within an interval of 2Td proceeding from a start point of the recording pulse train WPT according to the level of the wobbling signal WS. Actually, at position on the optical recording medium that the wobbling signal has a negative peak value, a pulse signal WPS detected by the recorded signal detector of FIG. 4 has a reduced width, as shown FIG. 7. In order to compensate the reduced width, the start point of the modulated recording pulse train MWPT is equal to that of the recording pulse train WPT to increase the width of the modulated recording pulse train MWPT by an interval of "Td", as shown FIG. 12. Also, if the wobbling signal WS is a negative value of "b", the start point of the modulated recording pulse train MWPT is delayed by a period of "Tb" from that of the recording pulse train WPT to increase the width of the modulated recording pulse train by a interval of Td-Tb. Meanwhile, if the wobbling signal WS is a value of "0", the start point of the modulated recording pulse train MWPT is delayed by a period of Td from that of the recording pulse train WPT. On the other hand, at a position that the wobbling signal has a positive peak value, a pulse signal WPS detected by the recorded signal detector of FIG. 4 has an extended width in minimum, as shown FIG. 7. In order to compensate the extend width, the start point of the modulated recording pulse train MWPT is delayed by a period of 2Td relative to the start point of the recording pulse train WPT. The modulated recording pulse train MWPT has a width reduced by an interval of "Td", as shown FIG. 12. Also, if the wobbling signal WS has a positive value of "c", the start point of the modulated recording pulse train MWPT is delayed by a period of "Tc" from that of the recording pulse train WPT. The modulated recording pulse train is reduced by an interval of "Tc–Td" in the width. The varied width of 2Td of the modulated recording pulse train MWPT is appropriately established on the basis of an amplifying gain of the wobbling signal WS, a reflective rate of the optical recording medium at the reproducing mode, etc.

Figure 13:
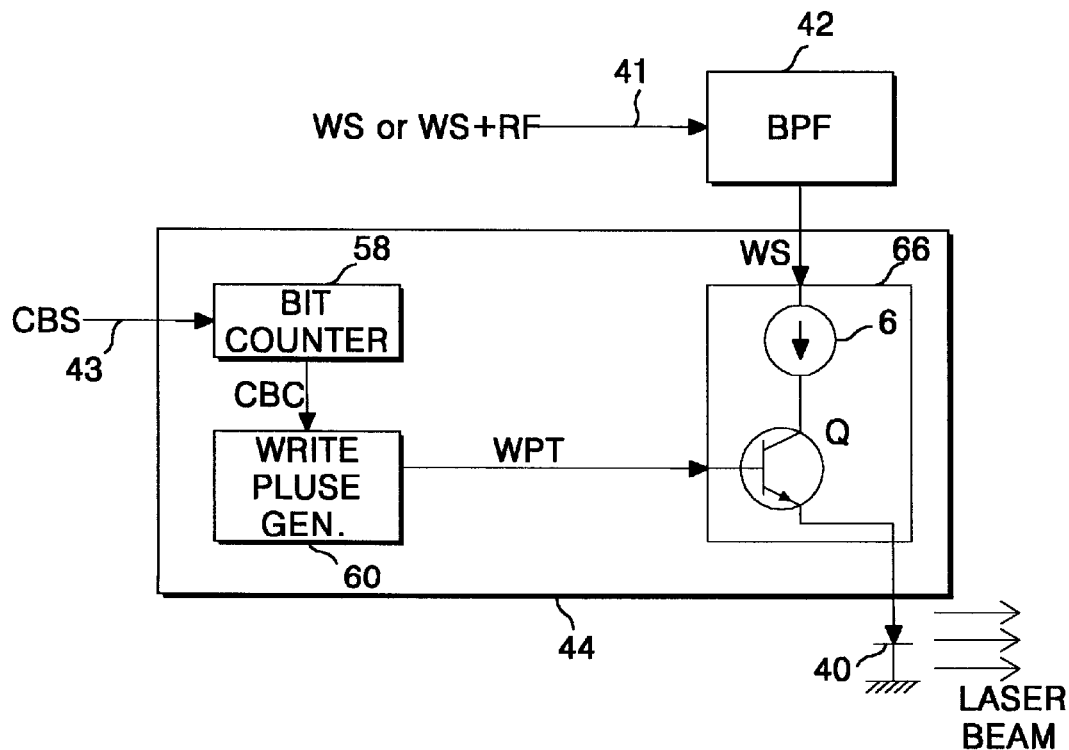
FIG. 13 is a detailed block diagram of the data recording apparatus illustrating another embodiment of the signal modulating stage shown in FIG. 8.
Figure 14:
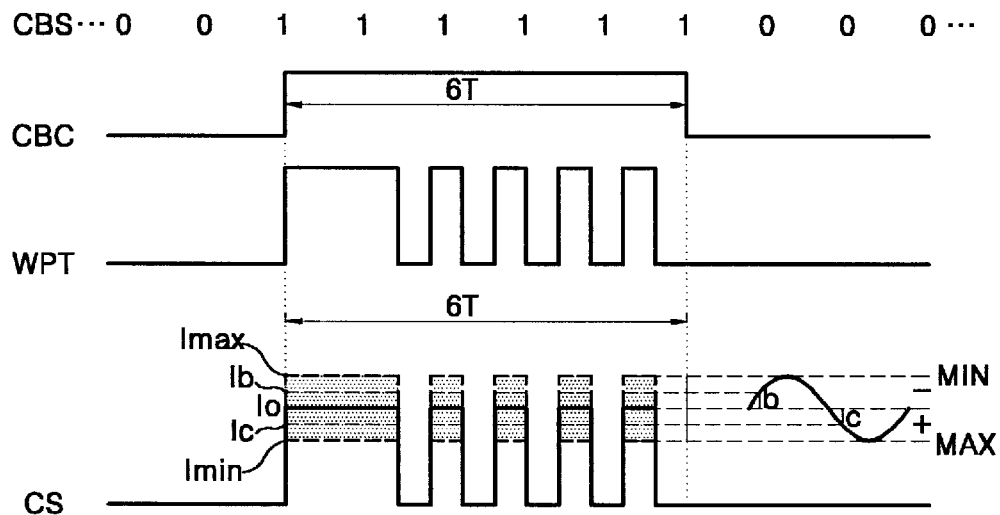
FIGS. 14 and 15 are waveform diagrams for explaining an operation of the data recording apparatus of FIG. 13.
Figure 15:
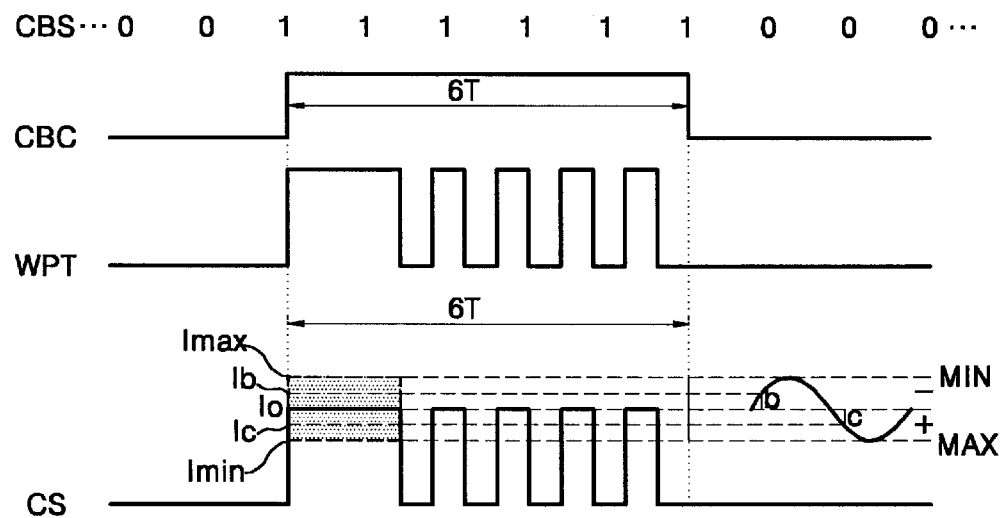

FIG. 13 illustrates another embodiment of the signal modulating stage 44 shown in FIG. 8, in detail. In FIG. 13, the signal modulating stage 44 includes a bit counter 58, a recording pulse generator 60 and a light driver 66 connected between the second input line 43 and the laser diode 40 in series. The bit counter 58 checks whether the data included in the channel bit stream CBS has the length of 3T to 11T, and generates a pulse having a specific logic (i.e., a high logic) in a period which "1" is continued. The bit counter 58 converts the channel bit stream CBS into a channel bit clock CBC having a shape of signal required by the optical recording medium, as shown FIGS. 14 and 15. Intervals of high and low logic in the channel bit clock CBC have the length of the 3T to 11T. The recording pulse generator 60 converts the channel bit clock CBC into a signal of a shape adapted to generate recording lights. To this end, a recording pulse train WPT such as shown FIGS. 14 and 15 is produced in the recording pulse generator 60. The light driver 66 receives the wobbling signal WS from the BPF 42 as well as the recording pulse train WPT from the recording pulse generator 60. The light driver 66 switches a current signal to be applied to the laser diode 40 according to the recording pulse train WPT such that the laser diode 40 irradiates a laser beam on the optical recording medium. Also, the light driver 66 adjusts an intensity of the current signal to be applied to the laser diode 40 depending on the level of the wobbling signal WS, thereby controlling an intensity (or a light power) of the laser beam to be irradiated on the optical recording medium. To this end, the light driver 64 includes a transistor Q for switching the current signal to be continuously applied from a variable current source VCS to the laser diode 40 according to the recording pulse train from the pulse width generator 60. The variable current source VCS adjusts the quantity of the current signal to be applied to transistor Q on the basis of the wobbling signal WS from the BPF 42. The transistor Q is turned-on to transmit the current signal CS from the variable current source VCS to the laser diode 40, when the recording pulse go to a high logic. Whereas, if the recording pulse has a low logic, the transistor Q is turned-off to break the current signal CS applying to the laser diode 40. In other words, the transistor Q switches the constant current signal to be applied to the laser diode 40 such that the laser diode 40 irradiates the laser beam on the optical recording medium. Then, the laser beam irradiated on the optical recording medium is switched responding to the channel bit stream CBS. Also, the intensity of the laser beam is varied with the level of the wobbling signal WS such that the size of a pit defined on the optical recording medium is varied. Therefore, the user data is recorded on the optical recording medium in a state of amplitude modulating depending on the wobbling signal WS. As a result, only the radio frequency signal RF including the user data is detected from the optical recording medium at a reproducing mode. This result from that a wobbling signal WS pre-formatted on tracks of the optical recording medium has offset by a wobbling component included in the recorded user data (i.e., the recording pit train) on the optical recording medium at a reproducing mode.

Figure 7:
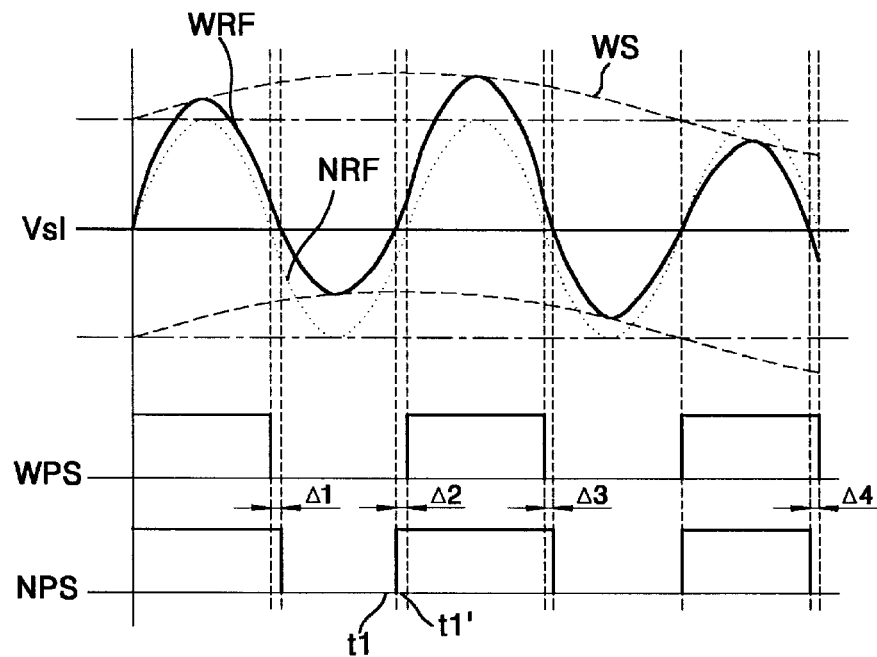
FIG. 7 is waveform diagrams for comparing a wobbling radio frequency signal mixed with a wobbling signal with pulse signals reconstructed from a normal radio frequency signal without a wobbling signal.

FIGS. 14 and 15 explain an operation for offsetting the wobbling signal by the variable current source VCS. FIGS. 14 and 15 shows a data of 6T as an example of the channel bit stream. In FIG. 14, the current signal has a waveform which all the pulses included in the recording pulse train is modulated by an amplitude modulation. Whereas, FIG. 15 illustrates a current signal which only a start pulse among the pulses included in the recording pulse train is modulated by an amplitude modulation. When the user data is recorded at a position which the level of the wobbling signal is "0", the quantity of the current signal CS generated in the variable current source VCS is set up an "Io". Meanwhile, a pulse signal WPS, detected by the recorded signal detector at a position on the optical recording medium that the wobbling signal has a negative peak value, has a reduced width in minimum as shown in FIG. 7. In order to compensate the reduced width, the variable current source VCS applies the current signal CS having a maximum quantity Imax to the transistor Q. Also, the variable current source VCS applies a current quantity of "Ib" to the transistor Q when the wobbling signal WS has a negative value of "b". On the other hand, the variable current source VCS applies the current signal CS having a minimum quantity Imin to the transistor Q in a case that the wobbling signal WS has a positive peak value. Also, the variable current source VCS applies the current signal having a quantity of "Ic" to the transistor Q when the wobbling signal WS has a positive value of "c". In other words, the light driver 66 amplitude modulates the recording pulse train WPT from the recording pulse generator 60 with the wobbling signal WS from the BPE 42. As the quantity of the current signal CS increases gradually depending on the level of the wobbling signal WS, the intensity of the laser beam irradiated on the optical recording medium increases gradually. Therefore, the pit defined by the laser beam on the optical recording medium is gradually wider. Whereas, if the quantity of the current signal CS is gradually depending on the level of the wobbling signal WS, the intensity of the laser beam irradiated on the optical recording medium is gradually smaller. Therefore, the pit defined by the laser beam on the optical recording medium is gradually narrow.

As described above, in the data recording apparatus for an optical recording medium according to the present invention, a user data is recorded on the optical recording medium in a state of modulating with a wobbling signal detected from the medium. To this end, a wobbling signal pre-formatted on the optical recording medium is offset by the wobbling signal included in the modulated user data when the optical recording medium is reproduced. Then, a radio frequency signal only including the user data is picked up from the optical recording medium. Accordingly, the user data recorded on the optical recording medium by means of the recording method according to the present invention does not distort in the reproducing mode. Consequently, according to the present invention, since the correction of error and the second pick-up of signal are unnecessary, it becomes possible to improve the responsiveness as well as an access time of the optical recording medium. Furthermore, the data recording apparatus according to the present invention can access various optical recording mediums.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of recording information on an optical recording medium, comprising the steps of:

(A) detecting a periodic signal pre-recorded on the optical recording medium; and (B) recording a signal on the optical recording medium by compensating a laser beam driving signal depending on an amplitude level of the periodic signal.

2. The method as claimed in claim 1, wherein the periodic signal is a wobbling signal formed on a recording layer of the optical recording medium.

3. The method as claimed in claim 1, wherein the signal recorded at the (B) step is a data signal in accordance with an input data to be recorded.

4. The method as claimed in claim 1, wherein the (B) step adjusts a light quantity in accordance with the signal to be recorded on the optical recording medium.

5. The method as claimed in claim 1, wherein the (B) step controls the width of a recording pulse in accordance with the signal to be recorded on the optical recording medium.

6. The method as claimed in claim 5, wherein the width of the recording pulse is varied by delaying a start point of the recording pulse.

7. A method of recording information on an optical recording medium, comprising the steps of:

(A) detecting a wobbling signal from wobbled groove/land tracks on the optical recording medium; and (B) recording a signal on the optical recording medium by compensating a laser beam driving signal depending on an amplitude of the wobbling signal.

8. The method as claimed in claim 7, wherein the (A) step detects an amplitude of the wobbling signal, and the (B) step performs a recording control according to the amplitude detected in the (A) step.

9. The method as claimed in claim 7, wherein the wobbled groove/land tracks are formed on a recording layer of the optical recording medium.

10. The method as claimed in claim 7, wherein the (B) step adjusts a light quantity in accordance with the signal to be recorded on the optical recording medium.

11. The method as claimed in claim 7, wherein the (B) step controls the width of a recording pulse in accordance with the signal to be recorded on the optical recording medium.

12. The method as claimed in claim 11, wherein the width of the recording pulse is varied by delaying a start point of the recording pulse.

13. A method of recording a signal on an optical recording medium, comprising the steps of:

(A) detecting a specific periodic signal pre-recorded on the optical recording medium;

(B) generating a timing signal corresponding to the signal to be recorded on the optical recording medium; and (C) compensating the timing signal according to an amplitude level of the specific periodic signal.

14. An apparatus for recording information on an optical recording medium, comprising:

a detector to detect a periodic signal pre-recorded on the optical recording medium; and a compensator to compensate a signal in accordance with an amplitude level of the periodic signal.

15. The apparatus as claimed in claim 14, wherein the compensator includes:

a signal generator to produce a recording shape of the signal from an input data; and a controller to control any one of width and amplitude in the recording shape of the signal according to the amplitude level of the periodic signal.

16. The apparatus as claimed in claim 14, wherein the compensator includes:

a signal generator to produce the signal corresponding to an input data and to modulate the signal depending on the amplitude level of the periodic signal; and a signal driver to output a light driving signal in accordance with the signal generated and modulated by the signal generator.

17. The apparatus as claimed in claim 14, wherein the periodic signal is a periodic wobbling signal detected from a recording face formed in a wobbled pattern.

18. The apparatus as claimed in claim 14, wherein the periodic signal is a support signal recorded on the optical recording medium for a recording and reproducing of data.

19. An apparatus for recording a recording signal on an optical recording medium, comprising:

a signal generator to generate the recording signal corresponding to an input data;

a detector to detect a specific periodic signal recorded previously on the optical recording medium;

a controller to compensate a width of the recording signal on the basis of the periodic signal; and a light driver to convert the recording signal having a compensated width into a light driving signal.

* * * * *